United States Patent [19]
Thary

[11] Patent Number: 5,164,197
[45] Date of Patent: Nov. 17, 1992

[54] BATCH MOLDING OF OPEN-CELL SOFT POLYURETHANE FOAM

[75] Inventor: Christian Thary, Farmington Hills, Mich.

[73] Assignee: Creme Art Corporation, Walled Lake, Mich.

[21] Appl. No.: 728,234

[22] Filed: Jul. 10, 1991

Related U.S. Application Data

[63] Continuation of Ser. No. 490,473, Mar. 8, 1990, Pat. No. 5,061,420.

[51] Int. Cl.[5] .................. B29C 45/47; B29C 45/53
[52] U.S. Cl. ................... 425/4 R; 425/207; 425/561; 425/817 R; 264/54
[58] Field of Search ............ 425/4 R, 207, 208, 206, 425/817 R, 561; 264/54, DIG. 77, 51

[56] References Cited

U.S. PATENT DOCUMENTS

| | | | |
|---|---|---|---|
| 2,649,620 | 8/1953 | Miller | 425/817 R |
| 3,268,635 | 8/1965 | Kraus et al. | 425/817 R |
| 3,697,204 | 10/1972 | Kyritsis et al. | 425/4 R |
| 3,706,515 | 12/1972 | Keuerleber et al. | 425/4 R |
| 3,933,312 | 1/1976 | Fries | 425/817 R |
| 3,975,128 | 8/1976 | Schluter | 425/817 R |
| 4,141,470 | 2/1979 | Schulte et al. | 425/817 R |
| 4,260,355 | 4/1981 | Rohrig et al. | 425/258 |
| 4,314,963 | 2/1982 | Boden et al. | 425/817 R |
| 4,507,255 | 3/1985 | Shizawa | 425/817 R |
| 4,548,776 | 10/1985 | Holdredge, Jr. | 425/817 R |
| 4,717,518 | 1/1988 | Cavender | 264/51 |
| 4,721,279 | 1/1988 | Oleszko et al. | 249/141 |
| 4,778,659 | 10/1988 | Inoue | 422/135 |

Primary Examiner—Jay H. Woo
Assistant Examiner—Khanh P. Nguyen
Attorney, Agent, or Firm—Brooks & Kushman

[57] ABSTRACT

An apparatus (20) for batch molding open-cell soft polyurethane foam within a mold (22a,22b,104) is provided by introducing into a mixing chamber (26) of a mixing pot (24) a highly activated polyol component and an isocyanate component which are mixed and permitted to foam to provide upward expansion in a viscous state through an upper outlet (28) by free rise that fills the mold (22,104). Such batch molding provides "one age of foam" that enables molding to be performed which was not previously possible. Both a rigid mold (22) and a flexible mold (104) can be utilized. The mixing pot (24) includes a mixer 38 preferably embodied by a rotatable screw (74) that is moved axially to purge the mixing chamber (26) of foam after each cycle. A plurality of the mixing pots (24) can be used to supplyy foam to the mold (22a,22b), such that foam of the same composition is supplied to the mold (22a) as is necessary with large molds, or such that foam of different compositions is supplied to the mold (22b) as is necessary with certain foam products.

9 Claims, 5 Drawing Sheets

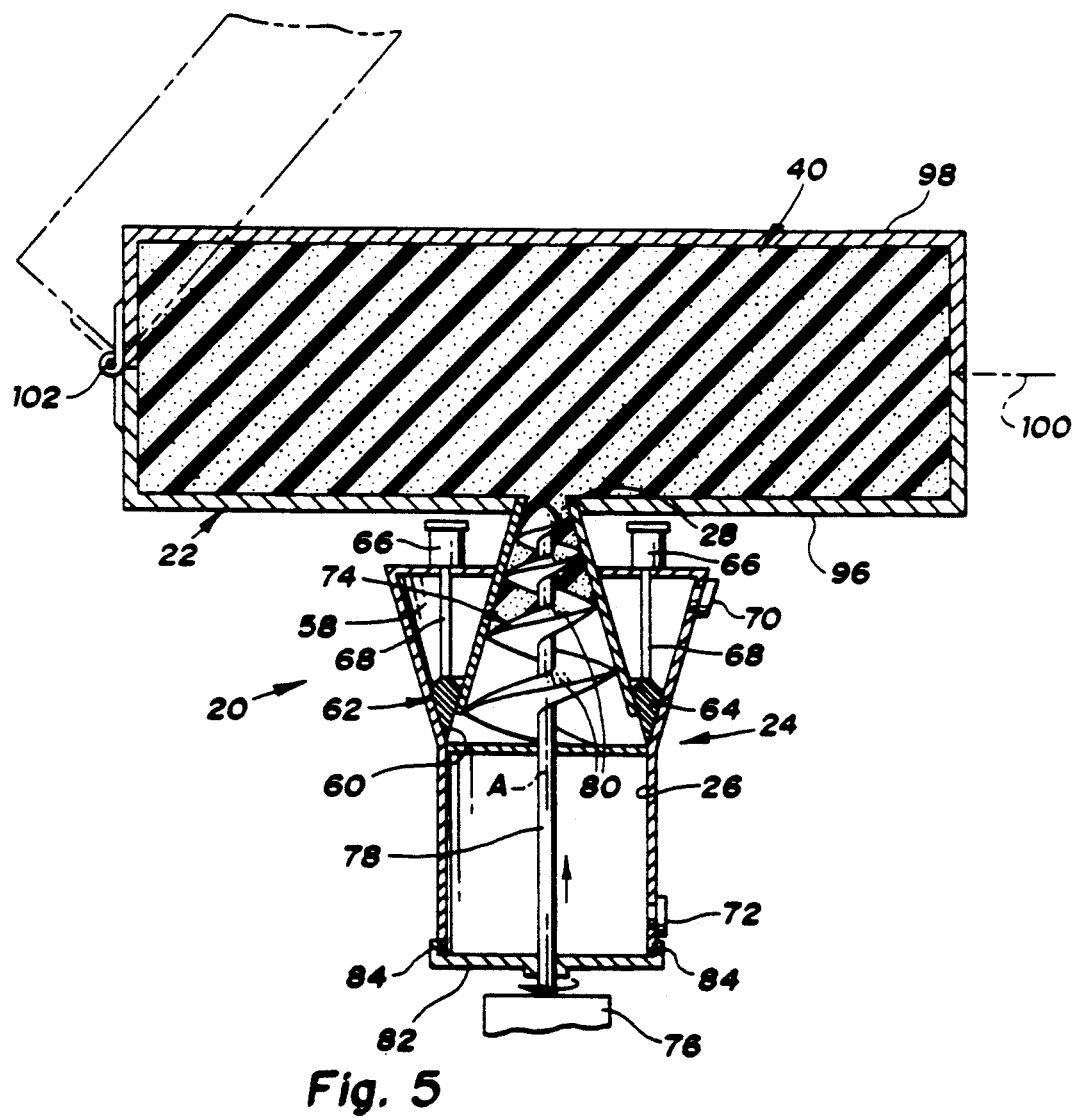
Fig. 5
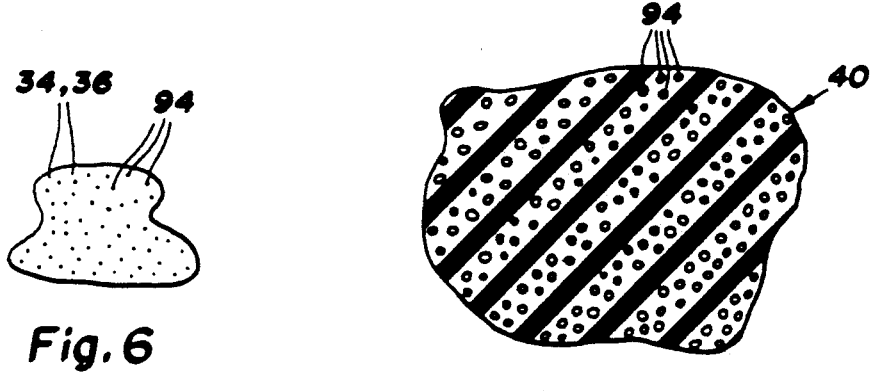
Fig. 6
Fig. 7

BATCH MOLDING OF OPEN-CELL SOFT POLYURETHANE FOAM

This is a divisional of copending application Ser. No. 07/490,473 filed on Mar. 8, 1990 now U.S. Pat. No. 5,061,420.

TECHNICAL FIELD

This invention relates to batch molding of open-cell soft polyurethane foam.

BACKGROUND ART

Molding of open-cell soft polyurethane foam is conventionally performed by either batch or continuous processing. Existing batch systems for performing molding of open-cell soft polyurethane foam introduce a relatively slow reacting polyol and isocyanate liquid mixture into the mold from locations either above or below the mold as is more fully described below. After such introduction into the mold, the liquid mixture of polyol and isocyanate expands upon foaming to fill the mold with "one age of foam" as compared to "different age of foam" which results with continuous molding of open-cell soft polyurethane foam. Such continuous molding provides mixing of the polyol and isocyanate over an injection time period that varies depending upon how much foam is required and, for larger volumes, the initially mixed mixture is older than the finally injection mixture such that the ability of the expanding foam to completely fill the mold with a uniform consistency is adversely affected.

Batch type systems for molding of open-cell soft polyurethane foam as mentioned above provide a liquid mixture of polyol and isocyanate that eliminates the "different age of foam" problem involved with continuous systems. As such, the foam can more readily expand to completely fill the mold and thereby provide a superior product. However, there are still problems that result with existing batch type systems as described below.

Prior art batch type systems for supplying the liquid mixture of polyol and isocyanate to the mold from above have previously been of two types. In one type such as disclosed by U.S. Pat. No. 2,649,620 Miller and U.S. Pat. No. 4,260,355 Rohrig et al, a mixing chamber with an open bottom is positioned within the mold so that the mold provides a floor that closes the bottom of the mixing chamber and permits the introduction of the polyol and isocyanate for mixing by a mixer inserted from above. Lifting of the mixing chamber then allows the liquid mixture to be distributed throughout the mold for eventual foaming and concomitant expansion that fills the mold. The other type of top feed batch type system utilizes a mixing chamber that is supped above the mold and has a lower openable door such that polyol and isocyanate introduced into the closed mixing chamber for mixing by a mixer that is introduced from above can subsequently be released as a liquid mixture into the mold upon opening of the door whereupon the liquid mixture spreads through the mold in preparation for the foaming and concomitant expansion that fills the mold.

Prior batch type systems for batch molding open-cell soft polyurethane foam that is supplied into a mold from below incorporate a mold mixing chamber within the lower mold extremity or floor. A piston that closes the mixing chamber is movable vertically by a suitable actuator. Positioning of the piston in a lower position permits the polyol and isocyanate to be introduced into the mixing chamber for mixing by a mixer that is inserted into the mixing chamber from above. After the mixing, the piston moves the liquid mixture upwardly such that it is capable of filling the lower extremity of the mold in preparation for foaming and concomitant expansion that fills the mold. Such a mold construction is relatively expensive to produce since each mold must incorporate the piston/actuator construction associated with the mixing chamber.

With each of the types of batch molding systems described above, the time required to perform the mixing and transfer the liquid mixture of polyol and isocyanate to the mold necessitates that the mixture have a relatively slow reaction time such as on the order of about three to six minutes or more before foaming and concomitant expansion takes place. As such, the polyol cannot be highly activated with catalyst since the foaming and expansion would than be too fast to permit the transfer of the liquid mixture into the mold for distribution prior to the foaming and concomitant expansion that fills the mold. Also, the polyol and isocyanate must be at ambient temperature of approximately 70° Fahrenheit because the small amount of catalyst which may be utilized tends to go to a gas state at temperatures over the ambient temperature of 70° Fahrenheit and the balance of components is thus varied by that change such that uniform reaction cannot take place. Rather, the heat necessary to initiate the reaction must be provided by heating of the mold to approximately 180° Fahrenheit which necessarily makes such conventional batch molding processes more difficult and expensive to be performed than would be the case without such mold heating.

In view of all of the problems discussed above, batch type molding of open-cell soft polyurethane foam has only been commercially used with relatively large foam products and with open mold or free rise molds wherein the upper extremity of the mold is defined by a movable mold member that provides shape to the upper foam surface but is easily moved upwardly so that the foam can freely expand upon foaming.

Additional prior art references noted in connection with the investigation conducted with respect to the present invention includes: U.S. Pat. No. 3,268,635 Krauss et al which discloses a plastic material having a foaming agent that is injected from an extruder into a mold cavity under pressure such that no foaming takes place until there is subsequent heating of the mold; U.S. Pat. No. 4,717,518 Cavender which discloses a mold that is filled with a high resiliency polyurethane foam that is exposed to atmospheric pressure at a time during the cure cycle such that the polymer strength is sufficient to contain the internal cell pressures which are greater than atmospheric such that there is no collapsing of the foam cells; and U.S. Pat. No. 4,721,279 Oleszko et al which discloses a foam mold having a self-cleaning mold vent.

DISCLOSURE OF INVENTION

An object of the present invention is to provide an improved method and apparatus for batch molding open-cell soft polyurethane foam in a mold. In carrying out this object, both the method and apparatus utilize a mixed batch of fast reacting foamable polyurethane liquid mixture whose expansion upon foaming to a viscous condition provides the impetus for "free rise"

filling of the mold such that there is "one age of foam" that overcomes problems associated with continuous machines having "different ages of foam". Also, the relatively viscous state of the foam upon expanding into the mold avoids problems in connection with the molding.

The method for batch molding open-cell soft polyurethane foam within a mold in accordance with the invention is performed by introducing into a mixing chamber having an upper outlet a highly activated polyol component and an isocyanate component that are reactive with each other to provide an open-cell soft polyurethane foam. Mixing of the activated polyol and isocyanate components with each other within the mixing chamber is performed to provide a fast reacting foamable polyurethane liquid mixture. This mixture is permitted to expand upon foaming to provide upward flow thereof from the mixing chamber through the upper outlet into the mold for molding as an open-cell soft polyurethane foam product.

In the preferred practice of the method, one of the polyol/isocyanate components is introduced into the mixing chamber through an upper holding chamber from which that component can flow downwardly into the mixing chamber for mixing with the other component. Introduction of the polyol and isocyanate components for mixing with each other by use of such holding and mixing chambers facilitates the performance of the method on a production basis.

The polyol and isocyanate components are most preferably mixed by a rotatable screw that rotates about a vertical axis. This rotatable screw is also preferably moved upwardly along its vertical axis to purge the mixing chamber of foam in preparation for the next cycle.

The method of the invention also facilitates the use of a filler that is introduced into the mixing chamber for mixing with the activated polyol and isocyanate components. This filler is most preferably an expandable plastic such as expandable polyethylene beads that are capable of expanding many times upon being subjected to heat that is generated by the polymerization that takes place during the foaming. Such a filler thus substantially reduces the volume of polyol and isocyanate required and thereby reduces the cost of the final foam product. The filler can be initially introduced into the mixing chamber in the polyol and/or the isocyanate as may be most advantageous for the particular product being made.

In performing the method, the foaming mixture can be supplied to either a rigid mold or a flexible mold for molding. With a rigid mold, at least two mold portions are movable between closed and open positions with respect to each other and have a parting lien at which the foaming mixture is incapable of penetrating due to its viscous state upon expansion into the mold. Flexible molds utilized can be permeable without the foaming mixture permeating the mold so as to thereby permit manufacturing of foam products in a manner that has not previously been possible.

A plurality of mixing pots having associated mixing chambers can also be used in accordance with the method to supply foam to the mold. Foam of the same composition is supplied to the mold by a plurality of the mixing pots to permit molding of relatively large foam products. Furthermore, foam of different compositions is supplied to the mold by the mixing pots in the manufacturing of certain foam products that require different foam composition at different locations.

Apparatus for batch molding open-cell soft polyurethane foam within a mold in accordance with the invention includes a mixing pot that defines a mixing chamber and has a first inlet through which the highly activated polyol or isocyanate component is introduced into the mixing chamber. The mixing pot also has a second inlet through which the other component is introduced into the mixing chamber, and the mixing pot also has an upper outlet for communicating with the mold. A mixer of the apparatus mixes the activated polyol and isocyanate components with each other within the mixing chamber to provide a fast reacting foamable polyurethane liquid mixture whose expansion upon foaming provides upward flow thereof from the mixing chamber through the upper outlet into the mold for molding as an open-cell soft polyurethane foam product.

In the preferred construction of the apparatus, the mixing pot includes a holding chamber that receives the polyol or isocyanate component introduced through the first inlet. This holding chamber has an outlet through which the component introduced there into flows downwardly from the holding chamber into the mixing chamber. A valve of the apparatus controls the outlet of the holding chamber.

The preferred construction of the mixer of the apparatus includes a rotatable screw having a vertical axis about which the screw rotates to mix the polyol and isocyanate components with each other. A screw actuator of the apparatus rotates the screw to provide the mixing of the polyol and isocyanate components and subsequently moves the screw upwardly along its vertical axis to purge the mixing chamber of foam in preparation for the next cycle. The apparatus also preferably includes a lower plate that is mounted on the screw, and the apparatus positions the screw along its vertical axis such that the lower plate is located below the second inlet as the polyol or isocyanate component is introduced therethrough into the mixing chamber. Subsequently, the actuator moves the screw upwardly along its vertical axis such that the lower plate is located above the second inlet as the screw is rotated to mix the polyol and isocyanate components. The actuator thereafter moves the lower plate upwardly with the screw after the foam expansion into the mold such that the lower plate and screw cooperate with each other in purging the mixing chamber of foam in preparation for the next cycle.

In the preferred construction of the apparatus illustrated, the screw includes flights that define an upwardly pointed shape. The outlet of the mixing pot has an upwardly converging shape that receives the upwardly pointed shape of the screw when the screw is moved upwardly to purge the mixing chamber of foam in preparation for the next cycle.

The apparatus of the invention can also include a plurality of the mixing pots for supplying foam to the mold as previously described in connection with the method.

The objects, features and advantages of the present invention are readily apparent from the following detailed description of the best modes for carrying out the invention when taken in connection with the accompanying drawings.

BRIEF DESCRIPTION OF DRAWINGS

FIG. 5 is a view of the apparatus at a yet further stage where a mixer thereof has been moved to provide purging of the mixing chamber of the mixing pot in preparation for the next cycle and wherein the rigid mold is illustrated in a solid lien closed position in which the molding is performed and a partial phantom line open position that permits removal of the foam product;

FIG. 6 is a view that illustrates the introduction of a filler into the liquid mixture of activated polyol and isocyanate components;

FIG. 7 is a view that illustrates the foamed product with the filler dispersed therethrough and embodied by an expandable plastic that expands to many times its original volume in order to reduce the volume of polyol and isocyanate components necessary to perform the molding;

BEST MODES FOR CARRYING OUT THE INVENTION

Figure 1:
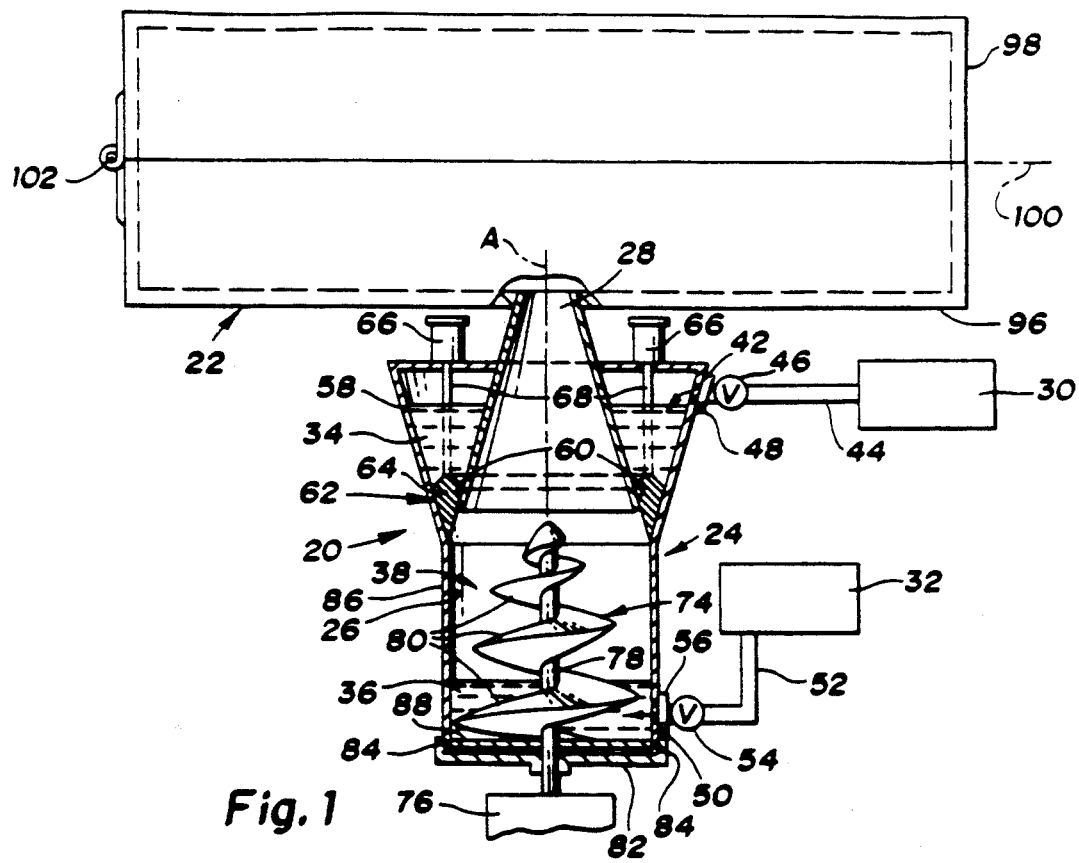
FIG. 1 is a somewhat schematic elevational view taken partially in section to illustrate apparatus in accordance with the invention that is utilized to perform the method thereof for making open-cell soft polyurethane foam and is shown with highly activated polyol and isocyanate components being introduced into a mixing pot in preparation for mixing and eventual molding within the rigid mold illustrated.

With reference to the drawings and initially to FIG. 1, the method for batch molding open-cell soft polyurethane foam in accordance with the method is performed by apparatus 20 of the invention in association with a mold 22. The method performed and the construction of the apparatus 20 will be described in an integrated fashion with each other to facilitate an understanding of the different aspects of the invention.

Figure 2:
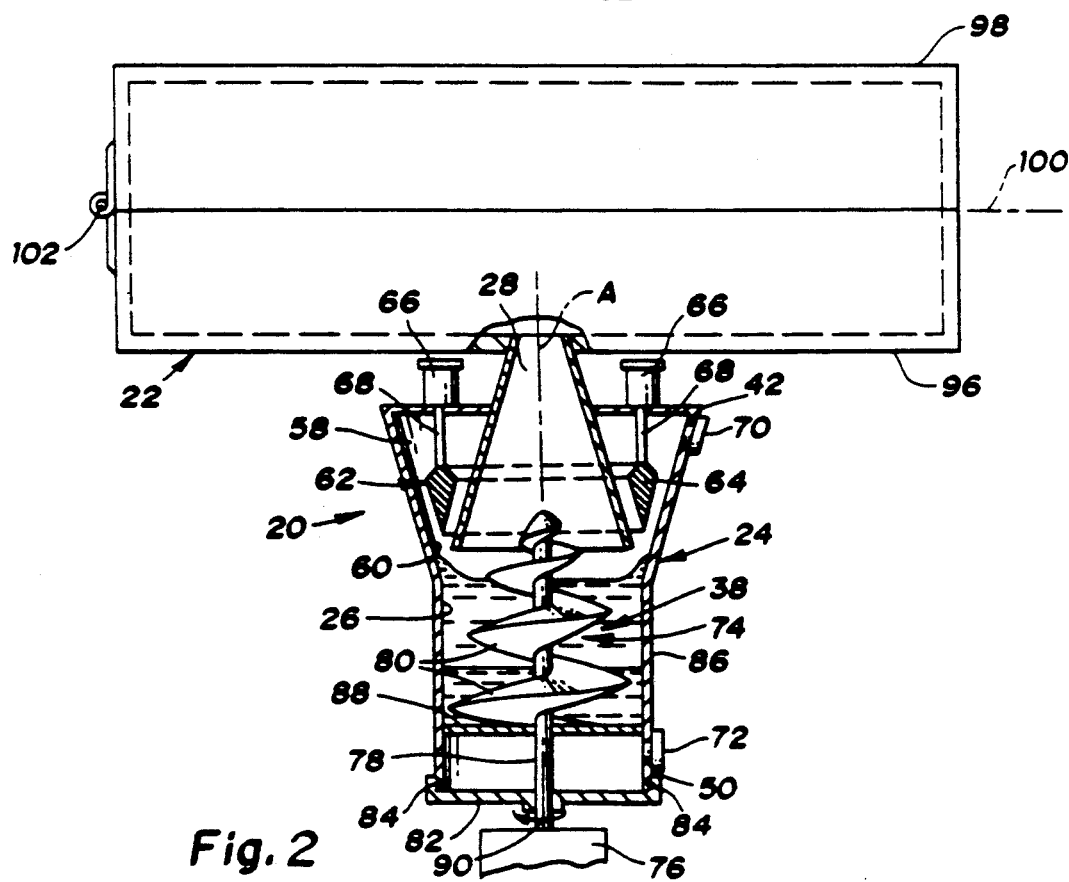
FIG. 2 is a view of the apparatus similar to FIG. 1 but at a further stage where the polyol and isocyanate components are initially introduced into a mixing chamber with each other in preparation for mixing.

As illustrated in FIG. 1, the apparatus 20 includes a mixing pot 24 that defines a mixing chamber 26. This mixing pot 24 also defines an upper outlet 28 from the mixing chamber 26 into the interior of the mold 22. A source 30 of highly activated polyol and a source 32 of isocyanate are utilized to provide components that are reactive with each other to provide an open-cell soft polyurethane foam. The highly activated polyol which is identified by 34 in FIG. 1 and the isocyanate which is identified by 36 are introduced from the sources 30 and 32, respectively, into the mixing chamber 26 of the mixing pot 24 as shown in FIG. 2. A mixer 38 of the apparatus as is hereinafter more fully described provides mixing of the activated polyol and isocyanate as shown in FIG. 2 to provide a fast reacting foamable polyurethane liquid mixture. This liquid mixture is permitted to expand upon foaming to provide upward flow thereof by free rise as a viscous liquid from the mixing chamber 26 through the upper outlet 28 into the mold 22 for molding as an open-cell soft polyurethane foam product 40 shown in FIG. 4.

As illustrated in FIG. 1, the mixing pot 24 has a first inlet 42 through which the polyol component 34 is supplied from the polyol source 30 via a conduit 44 which has a valve 46 and a disconnect coupling 48. A second lower inlet 50 of the mixing pot 24 is provided for introduction of the isocyanate component 36 from the isocyanate source 32 through a conduit 52 which has a valve 54 and a disconnect coupling 56. Above the mixing chamber 26 into which the second inlet 50 feeds directly, the mixing pot 24 includes a holding chamber 58 into which the upper first inlet 42 initially introduces the highly activated polyol through the conduit 44. This holding chamber 58 has a lower outlet 60 controlled by a valve 62. More specifically, the holding chamber 58 is illustrated as having an annular shape extending about a central vertical axis A about which the mixer 38 rotates as is hereinafter more fully described. This annular shape of the holding chamber 58 has a downwardly pointing shape on each side of the central axis A so as to facilitate the downward flow of the polyol. Valve 62 includes an annular valve element 64 that also has a downwardly pointing shape for closing the outlet 60 as shown in FIG. 1. A valve operator 66 of valve 62 is mounted on top of the mixing pot 24 above the holding chamber 58 and has connections 68 to the valve element 64 so as to provide vertical movement thereof between the closed position illustrated in FIG. 1 and the open position illustrated in FIG. 2.

While the mixing pot 24 illustrated in FIG. 1 illustrates the highly activated polyol component 34 as being introduced through the upper first inlet 42 and the isocyanate component introduced through the lower second inlet 50, the respective inlets through which these components are introduced can be reversed as there are competing criteria as to which of the two arrangements of introduction functions best. More specifically, the polyol has greater lubricity than the isocyanate such that it is best introduced into the holding chamber 58 through the upper first inlet 42 in order to ensure complete flow from the holding chamber downwardly through its outlet 60 into the mixing chamber 26 upon opening of the valve 62. Furthermore, the isocyanate is more sensitive to humidity and is thus advantageously introduced directly into the mixing chamber 26 as opposed to into the holding chamber 58 since any residue left within the holding chamber can react with humidity to create a residue that remains within the holding chamber after each cycle. On the other hand, approximately two times the volume of polyol is necessary in the reaction such that it is easier from a volumetric flow standpoint to introduce the isocyanate into the mixing chamber through the holding chamber 58 as there is less volume involved with the transfer flow. Furthermore, the isocyanate is much less viscous than the polyol such that it is easier for the isocyanate to fully flow downwardly from the holding chamber 58 into the mixing chamber 26. Regardless of which component is introduced through the first inlet 52 via the holding chamber 58 and which is introduced through the second inlet 50 directly into the mixing chamber 26, first and second stoppers 70 and 72 are used to plug the first and second inlets after disconnection therefrom by the associated conduits 44 and 52 shown in FIG. 1.

As illustrated in both FIGS. 1 and 2, the mixer 38 is preferably embodied by a screw 74 that rotates about the central vertical axis A to provide the mixing under the impetus of a rotary actuator 76. Screw 74 has a central vertical shaft 78 extending along the central axis A and has flights 80 that taper upwardly in a spiraling helical configuration along the shaft to define an upwardly pointed shape. At its lower end, the shaft 78 extends downwardly through a central opening in the bottom wall 82 which has a schematically indicated connection 84 to the side wall 86 of the mixing pot. A lower plate 88 of the mixer is fixed to the screw shaft 78 and to the lower extremity of the lowest flight 80. Actuator 76 is operable to move the screw shaft 78 vertically as well as rotationally so as to move upwardly from the position of FIG. 1 to the position of FIG. 2 above the second inlet 50 and to thereby isolate the foam components from the second outlet during the mixing which proceeds during the screw rotation indicated by arrow 90 prior to the valve opening.

Figure 3:
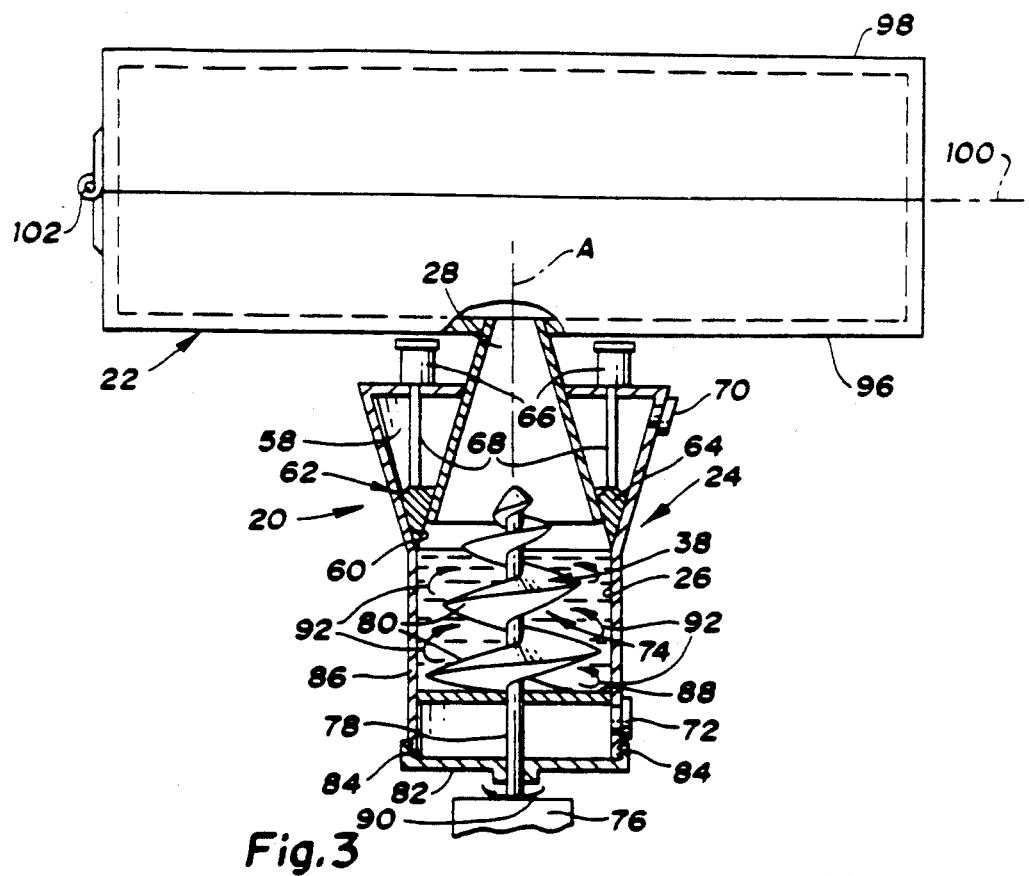
FIG. 3 is a view of the apparatus at a still further stage where mixing of the polyol and isocyanate is being performed.
Figure 4:
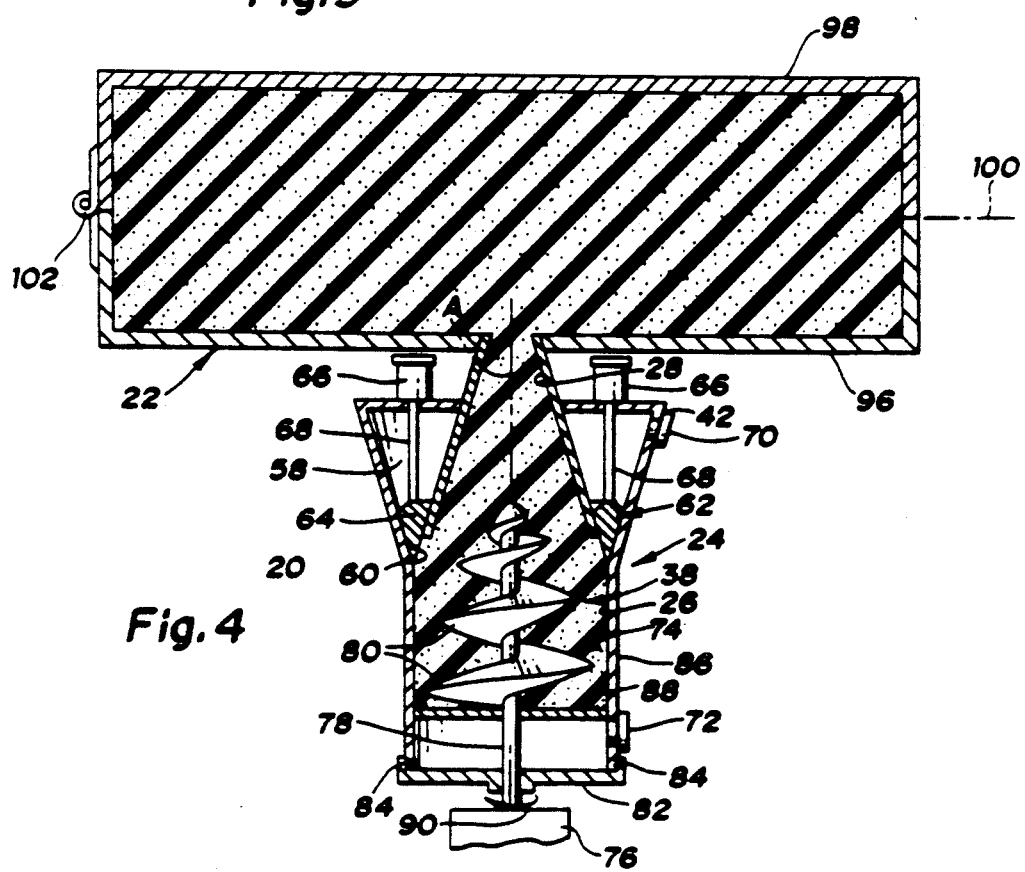
FIG. 4 is a view of the apparatus at a still further stage where expansion of the mixture upon foaming to a viscous state provides a free rise through an upper outlet of the mixing pot into the mold in order to fill the mold and perform the molding of the open-cell soft polyurethane foam product.

After the valve 62 has been opened as shown in FIG. 2 sufficiently long for the polyol or isocyanate component within the holding chamber 58 to fully drain downwardly into the mixing chamber 26, this valve 62 is closed as shown in FIG. 3 and the rotation of the screw 74 under the impetus of the rotary actuator 76 proceeds such that the components fully mix with each other as indicated y the eddy arrows 92. In a relatively short time period after the initial introduction of both components into the mixing chamber, less than 30 seconds and preferably less than 10 seconds, i.e., about 6-7 seconds, the highly activated polyol and isocyanate begin to foam to a highly viscous state and the resultant expansion as previously mentioned causes a free rise upward flow through the upper outlet 28 into the mold 22 as shown in FIG. 4. Throughout this expansion, the mixer screw 38 continues to rotate as shown by arrow 90 under the impetus of the rotary actuator 76.

After the mixture has had sufficient time to fully fill the mold 22 by the foaming expansion through the mixing pot outlet 28, the rotary actuator 76 moves the mixer screw 38 upwardly to the position of FIG. 5 to purge any remaining foam from the mixing chamber 26. Thus, during this upward movement, the lower plate 88 fixed to the screw 74 provides a wiping action along the mixing pot side wall 86. This upward movement also provides some compression of the partially cured foam product 40 within the mold 22. Subsequently, downward movement of the mixer screw 74 to the initial position of FIG. 1 and detachment of the connection 84 permits access to the mixing chamber 26 and the mixer screw 74 to permit removable of any foam residue in preparation for the next cycle. As previously mentioned, the mixer screw 74 has an upwardly pointed shape provided by its spiraling helical flights 80. Furthermore, the outlet 28 of the mixing pot has an upwardly converging shape that receives the upwardly pointed shape of the mixer screw 74 when the screw is moved upwardly as shown in FIG. 5 to purge the mixing chamber 26 of foam in preparation of the next cycle as discussed above. Also, the mixing pot outlet 28 has a relatively small size with respect to the mold 22 such that only a small foam sprue must be cut off to finish the foam product.

As shown in FIG. 6, the mixture of the polyol 34 and isocyanate 36 has a filler 94 which may be introduced into either one or both of these components prior to their mixing. This filler 94 is preferably an expandable plastic such as polyethylene that is capable of expanding to many times its size upon the heating that takes place during polymerization of the two components with each other such that the final foam product 40 as shown in FIG. 7 has the filler 94 disbursed throughout in a manner that permits substantial reduction in the amount of components necessary to make the product.

When a rigid mold 22 is utilized as illustrated in FIGS. 1 through 5, the lower and upper mold members 96 and 98 have a parting line 100 which is not penetrated by the highly viscous foam expanding into the mold during its free rise. As such, shapes of the resultant foam product 40 can be molded that were not heretofore possible with conventional batch molding of foam where the liquid mixture poured into the mold would seep through the parting line prior to foaming. After the complete filling of mold 22 and the initial curing, the upper mold member 98 is movable to the phantom line open position such as by rotation about the connection hinge 102.

Figure 8:
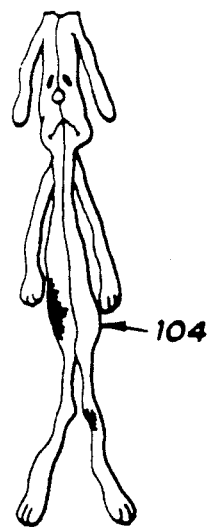
FIG. 8 is a view illustrating a flexible mold that can also be utilized to perform the molding.
Figure 10:
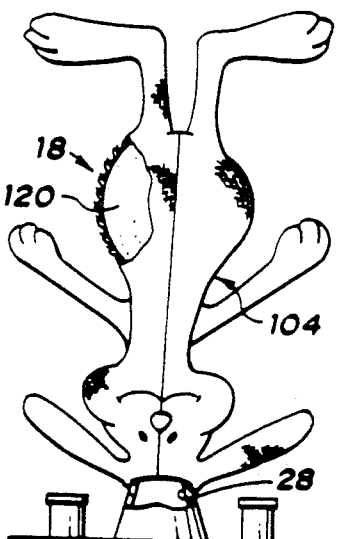
FIG. 10 is a view that illustrates the mixing pot of the apparatus utilized with the flexible mold to provide the foam product.
Figure 9:
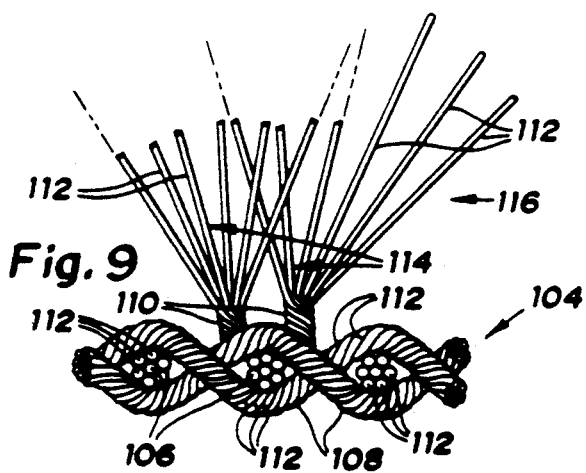
FIG. 9 is an enlarged view of the flexible mold which is shown as being a permeable material of wound yarn.

With reference to FIGS. 8 through 10, it is also possible to utilize the method and mixing pot 24 of the apparatus 20 with a flexible mold 104 which for purposes of illustration is shown as a toy animal. However, it should be understood that this flexible mold could also be embodied by a utilitarian component such as a vehicle seating component in the form of a seat bottom, back, headrest or armrest, etc. The flexible mold 104 is also illustrated in FIG. 9 as being permeable as provided by warp yarn 016, woof yarn 108 and connector yarn 110 with each of these yarns made up of separate strands 112. As illustrated, the strands 112 of the connector yarn 110 provide tufts 114 that function as a soft plush pile 116. However, it is also possible for the connector yarns to have a short pile such as is normally utilized with vehicle seating components as part of a permeable cover.

Prior to performing the batch molding process through a suitable opening in the permeable flexible mold 104, it is preferable to coat the interior of the mold with an aqueous gel that ensures that the expanding foam does not permeate the mold pores or yarns and thereby damage the mold which becomes a part of the final foam product 118 as illustrated in FIG. 10. This aqueous gel can be coated onto the interior of the cover 104 immediately prior to the introduction of the foaming mixture from the mixing pot 24 as shown in FIG. 10. Alternatively, the aqueous gel can be applied well ahead of that time such that it initially dries and is subsequently wetted to reform the gel. In either case, the gel permits gas generated by the foaming to escape through the flexible mold 104 while preventing the foam from permeating the mold pores and yarns.

In the preferred practice of foam molding, the aqueous gel utilized to provide the gel coating includes water and an acrylic acid polymer that is acid neutralized, i.e. to a ph of 7, which increases its viscosity. Good results are achieved by the use of an acrylic acid polymer manufactured by the Specialty Polymers & Chemicals Division of the B. F. Goodrich Company of Cleveland, Ohio, United States of America, under the trademark Carbopol. Best results have been achieved with the resin designated as Carbopol 940 which has a molecular weight of about 4,000,000, although acceptable results have also been achieved with Carbopol 934 which has a molecular weight of about 3,000,000 and consequently has a lesser viscosity.

Figure 11:
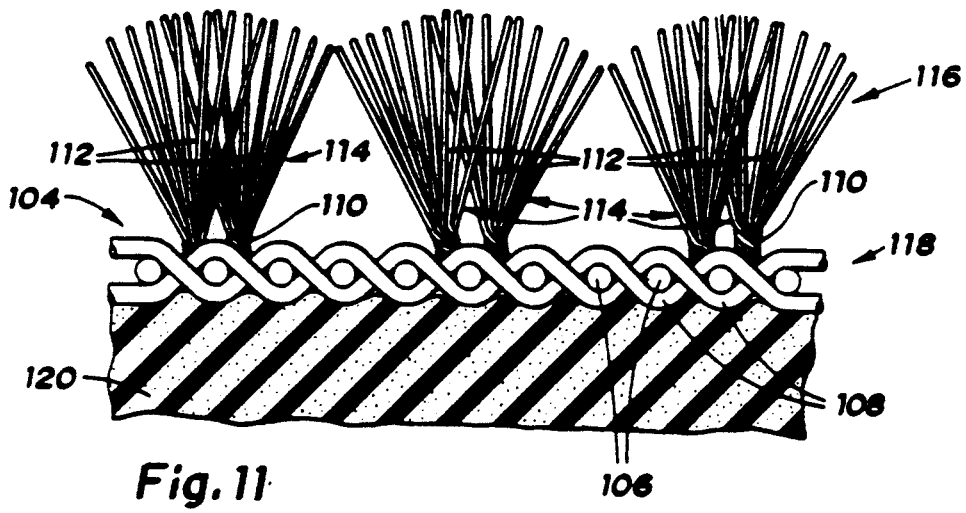
FIG. 11 is an enlarged view of a portion of FIG. 10 illustrating the interface of the permeable flexible mold and the molded foam.

After curing of the foam, the resultant foam product 118 has the flexible mold 104 engaged directly with the foam 120 as shown in FIG. 11 without the foam penetrating the cover and providing any disadvantageous results.

Figure 12:
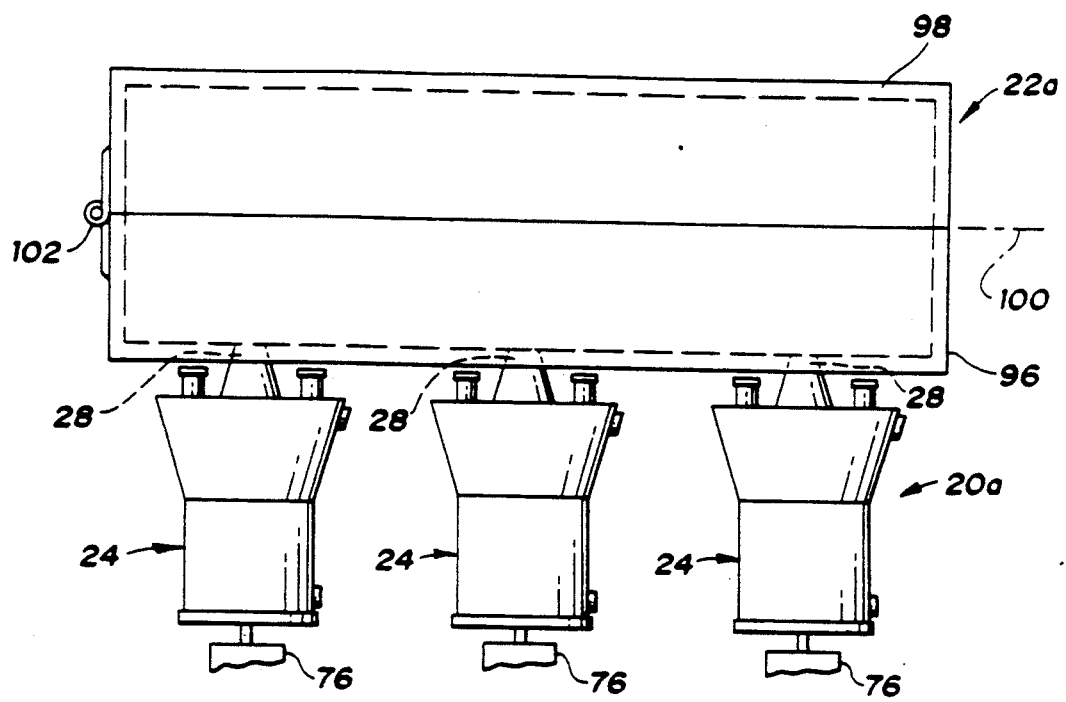
FIG. 12 is a view illustrating another embodiment of the apparatus wherein a plurality of mixing pots supply foam to the mold.
Figure 13:
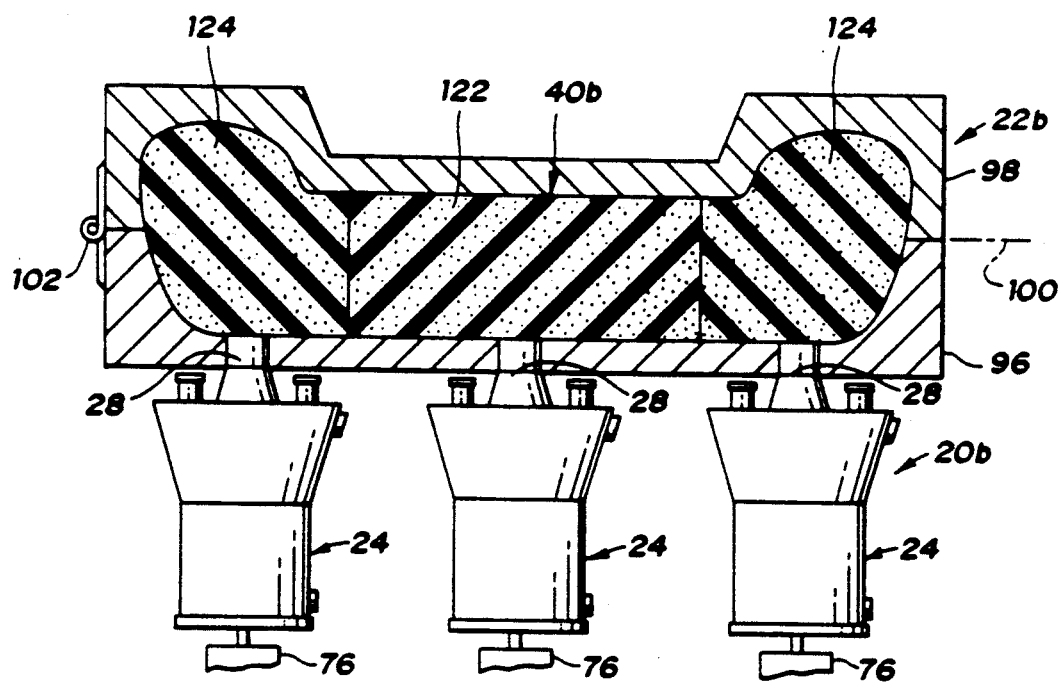
FIG. 13 is a view of a further embodiment of the apparatus wherein a plurality of mixing pots supply foam of different compositions to the mold.

With reference to FIGS. 12 and 13, two alternate embodiments of the apparatus 20a and 20b are illustrated as including a plurality of the mixing pots 24 for supplying foam to the associated molds 22a and 22b as described above. Provision of the multiple mixing pots 24 for supplying foam to each mold provides foam molding capability that could not otherwise be achieved as is more fully described below.

With specific reference to FIG. 12, the mold 22a is supplied foam by each of the three mixing pots 24 illustrated such that molding of relatively large foam products is possible. With such molding of large foam products, the foam supplied from each mixing pot 24 will normally be of the same composition such that the resultant foam product has a uniform consistency.

With specific reference to FIG. 13, the foam product 40b is molded within the mold 22b by foam supplied from the three mixing pots 24 illustrated. More specifically, the foam product 40b has a central portion 122 that is supplied from the central mixing pot 24 and has end portions 124 that are respectively supplied by the two end mixing pots 24. The foam supplied from the central mixing pot 24 has a different composition than the foam supplied by the two end mixing pots 24 such that the central portion 122 of the foam product 40b and the end portions 124 have different characteristics. As illustrated, the foam product 40b is designed to function as a seat bottom with its central portion 122 being softer than the end portions 124, which is possible due to the different compositions of the foam respectively provided by the central mixing pot 24 and the pair of end mixing pots 24. Likewise, other composite foam products can also be manufactured utilizing a plurality of mixing pots for supplying the foam through associated outlets 28 into the mold.

While the best modes for carrying out the invention have been described in detail, those familiar with the art to which this invention relates will recognize various alternative ways of practicing the invention as defined by the following claims.

What is claimed is:

1. Apparatus for mixing a highly activated polyol component and an isocyanate component that are reactive with each other to provide an open-cell soft polyurethane foam for batch molding in a mold, comprising:
   a mixing pot that defines a mixing chamber, said mixing pot having a first inlet through which one of the components is introduced into the mixing chamber and having a second inlet through which the other component is introduced into the mixing chamber, and said mixing pot having an upper outlet for communicating with the mold; and
   a rotatable mixer having a vertical axis about which the mixer is rotated to mix the activated polyol and isocyanate components with each other within the mixing chamber to provide a fast reacting foamable polyurethane liquid mixture whose expansion upon foaming provides upward flow thereof from the mixing chamber through the upper outlet into the mold for molding as an open-cell soft polyurethane foam product.

2. Apparatus as in claim 1 wherein the mixing pot includes a holding chamber that receives the one component from the first inlet, said holding chamber having an outlet through which the one component flows downwardly from the holding chamber into the mixing chamber, and a valve for controlling the outlet of the holding chamber.

3. Apparatus as in claim 1 or 2 wherein the mixer includes a rotatable screw that is rotated about the vertical axis to mix the polyol and isocyanate components with each other.

4. Apparatus as in claim 3 further including a screw actuator that rotates the screw to mix the polyol and isocyanate components and subsequently moves the screw upwardly along its vertical axis to purge the mixing chamber of foam in preparation for the next cycle.

5. Apparatus as in claim 4 wherein the screw includes flights of a spiraling helical configuration that defines an upwardly pointed shape.

6. Apparatus as in claim 5 wherein the outlet of the mixing pot has an upwardly converging shape that receives the upwardly pointed shape of the screw when the screw is moved upwardly to purge the mixing chamber of foam in preparation for the next cycle.

7. Apparatus as in claim 1 which includes a plurality of the mixing pots for supplying foam to the mold.

8. Apparatus for mixing a highly activated polyol component and an isocyanate component that are reactive with each other to provide an open-cell soft polyurethane foam for batch molding in a mold, comprising:
   a mixing pot that defines a mixing chamber, said mixing pot having a first inlet through which one of the components is introduced into the mixing chamber and having a second inlet through which the other component is introduced into the mixing chamber, and said mixing pot having an upper outlet for communicating with the mold; and
   a mixer including a screw having a vertical axis and an actuator that rotates the screw about the vertical axis to mix the activated polyol and isocyanate components with each other within the mixing chamber to provide a fast reacting foamable polyurethane liquid mixture whose expansion upon foaming provides upward flow thereof from the mixing chamber through the upper outlet into the mold for molding as an open-cell soft polyurethane foam product, the mixer including a lower plate that is mounted on the screw, the actuator initially positioning the screw along its vertical axis such that the lower plate is located below the second inlet as the component fed therethrough is introduced into the mixing chamber and subsequently moving the screw upwardly along its vertical axis such that the lower plate is located above the second inlet as the screw is rotated to mix the polyol and isocyanate components with each other, and the actuator subsequently moving the lower plate upwardly with the screw after the foam expansion into the mold such that he lower plate and screw cooperate with each other in purging the mixing chamber of foam in preparation for the next cycle.

9. Apparatus for mixing a highly activated polyol component and an isocyanate component that are reactive with each other to provide an open-cell soft polyurethane foam for batch molding in a mold, comprising:

a mixing pot that defines a mixing chamber having an upper outlet and also defines a holding chamber having an outlet that feeds downwardly into the mixing chamber, said mixing pot having a vale that controls the outlet of the holding chamber, said mixing pot having a first inlet through which one of the components is introduced into the holding chamber for subsequent flow under the control of the valve into the mixing chamber, and the mixing pot having a second inlet through which the other component is introduced into the mixing chamber before the one component is released by the valve from the holding chamber into the mixing chamber; and a mixer including a rotatable screw having a vertical axis about which the screw is rotated to mix the activated polyol and isocyanate components with each other within the mixing chamber to provide a fast reacting foamable polyurethane liquid mixture whose expansion upon foaming provides upward flow thereof from the mixing chamber through the upper outlet into the mold for molding as an open-cell soft polyurethane foam product.

* * * * *

UNITED STATES PATENT AND TRADEMARK OFFICE
CERTIFICATE OF CORRECTION

PATENT NO. : 5,164,197
DATED : November 17, 1992
INVENTOR(S) : Christian Thary

It is certified that error appears in the above-identified patent and that said Letters Patent is hereby corrected as shown below:

```
Column 1, Line 55
"supped" should be --supported--;

Column 7, Line 44
"y" should be --by--;

Column 8, Line 47
"016" should be --106--;

Column 11, Line 16, Claim 9 (Amendment Dated
                           Line 18, Claim 22),
"vale" should be --valve--.
```

Signed and Sealed this

Fifth Day of October, 1993

Attest:

BRUCE LEHMAN

Attesting Officer    Commissioner of Patents and Trademarks